United States Patent
DeSantis et al.

(10) Patent No.: US 9,530,525 B2
(45) Date of Patent: Dec. 27, 2016

(54) LOCKING FASTENER FOR SECURING COMPONENTS IN A NUCLEAR REACTOR

(75) Inventors: Paul K. DeSantis, Bentleyville, OH (US); Andrew D. Klush, Hudson, OH (US)

(73) Assignee: BWXT Nuclear Operations Group, Inc., Lynchburg, VA (US)

( * ) Notice: Subject to any disclaimer, the term of this patent is extended or adjusted under 35 U.S.C. 154(b) by 431 days.

(21) Appl. No.: 13/586,998

(22) Filed: Aug. 16, 2012

(65) Prior Publication Data

US 2013/0280006 A1 Oct. 24, 2013

Related U.S. Application Data

(60) Provisional application No. 61/635,054, filed on Apr. 18, 2012.

(51) Int. Cl.

| | |
|---|---|
| *F16B 39/28* | (2006.01) |
| *G21C 7/12* | (2006.01) |
| *G21C 13/02* | (2006.01) |
| *F16B 39/10* | (2006.01) |

(52) U.S. Cl.
CPC .............. *G21C 7/12* (2013.01); *F16B 39/108* (2013.01); *G21C 13/02* (2013.01); *Y02E 30/39* (2013.01)

(58) Field of Classification Search
CPC ....... F16B 39/108; F16B 39/02; F16B 39/025; G21C 13/02; G21C 7/12
USPC ........................................ 411/113, 111, 424
See application file for complete search history.

(56) References Cited

U.S. PATENT DOCUMENTS

| | | | | |
|---|---|---|---|---|
| 727,716 | A | * | 5/1903 | Uren ....................... F16B 39/02 |
| | | | | 279/100 |
| 1,196,565 | A | * | 8/1916 | McDonald .................... 411/184 |
| 1,374,054 | A | | 4/1921 | Bridge |
| 3,225,809 | A | * | 12/1965 | Peak, Sr. ....................... 411/223 |
| 4,818,476 | A | * | 4/1989 | Gasparro ...................... 376/294 |

(Continued)

FOREIGN PATENT DOCUMENTS

| | | |
|---|---|---|
| CN | 1488824 A | 4/2004 |
| CN | 101544266 A | 9/2009 |
| EP | 0048343 A1 | 3/1982 |

OTHER PUBLICATIONS

International Search Report and Written Opinion for PCT/US2013/026464 dated Nov. 1, 2013.

(Continued)

*Primary Examiner* — Gary Estremsky
(74) *Attorney, Agent, or Firm* — Nelson Mullins Riley & Scarborough, LLP (57) ABSTRACT

A threaded fastener includes a head, a threaded shank extending from a bottom face of the head along a longitudinal axis of the fastener, and an annular flange oriented transverse to the longitudinal axis and surrounding the bottom face of the head. A surface has a receiving hole in which the shank of the threaded fastener is disposed with the bottom face of the head contacting the surface. The surface further has a crimping recess spaced apart from the receiving hole. A portion of the annular flange overlaps and is deformed into the crimping recess. The fastener may be a screw or bolt. In the case of a bolt, a nut engages the distal end of the threaded shank. The nut also includes an annular flange that is deformed into a crimping recess on a surface proximate to the nut.

16 Claims, 9 Drawing Sheets

(56) References Cited

U.S. PATENT DOCUMENTS

| | | | |
|---|---|---|---|
| 4,905,546 A * | 3/1990 | Katscher | B21D 39/20 411/271 |
| 5,053,190 A | 10/1991 | Gardner et al. | |
| 5,089,218 A | 2/1992 | Gardner et al. | |
| 5,465,280 A | 11/1995 | Wedellsborg | |
| 5,563,927 A | 10/1996 | Siegel et al. | |
| 5,583,900 A | 12/1996 | Kasahara et al. | |
| 5,611,215 A * | 3/1997 | Saito et al. | 62/509 |
| 5,715,288 A | 2/1998 | Matteson | |
| 5,789,720 A | 8/1998 | LaGally et al. | |
| 5,871,319 A * | 2/1999 | Schneider | 411/107 |
| 5,935,439 A | 8/1999 | Hart et al. | |
| 6,055,288 A * | 4/2000 | Schwirian | G21C 5/02 376/302 |
| 6,091,791 A | 7/2000 | Matsumoto et al. | |
| 6,164,886 A * | 12/2000 | Matarazzo | F16B 39/105 411/176 |
| 6,546,066 B2 | 4/2003 | Baliga et al. | |
| 6,618,460 B2 | 9/2003 | Baliga et al. | |
| 6,769,262 B1 | 8/2004 | Gray | |
| 6,888,908 B1 | 5/2005 | Klarner et al. | |
| 6,909,765 B2 | 6/2005 | Lahoda | |
| 7,139,359 B2 | 11/2006 | Baliga et al. | |
| 7,389,669 B2 | 6/2008 | Badlani et al. | |
| 7,431,560 B2 * | 10/2008 | Sterner | F01D 17/165 415/160 |
| 7,567,645 B2 | 7/2009 | Baliga | |
| 7,882,919 B2 | 2/2011 | Ito | |
| 7,993,086 B2 * | 8/2011 | Kruse | F16B 39/105 411/114 |
| 2004/0017877 A1 | 1/2004 | Hartel et al. | |
| 2004/0136488 A1 | 7/2004 | Tuite et al. | |
| 2005/0117684 A1 | 6/2005 | Klarner et al. | |
| 2005/0190877 A1 | 9/2005 | Knapp | |
| 2005/0199591 A1 | 9/2005 | Coe et al. | |
| 2010/0288247 A1 * | 11/2010 | Tanikawa et al. | 123/568.11 |
| 2011/0014033 A1 * | 1/2011 | Boning et al. | 415/148 |
| 2011/0103916 A1 * | 5/2011 | Kim et al. | 411/114 |

OTHER PUBLICATIONS

Office Action dated Apr. 25, 2016 for Chinese Application No. 201310123466.6.

* cited by examiner

LOCKING FASTENER FOR SECURING COMPONENTS IN A NUCLEAR REACTOR

This application claims the benefit of U.S. Provisional Application No. 61/635,054 filed Apr. 18, 2012. U.S. Provisional Application No. 61/635,054 filed Apr. 18, 2012 is incorporated herein by reference in its entirety.

BACKGROUND

The following relates to the fastener arts, nuclear reactor arts, nuclear power generation arts, nuclear fuel arts, and related arts.

In environments such as nuclear reactors, ultra-high vacuum (UHV) processing systems, and the like, installed components are not readily accessible. In such environments, a threaded fastener that works itself loose over time due to exposure to chronic vibration, thermal cycling, or other environmental factors presents a serious difficulty. Numerous fastener locking schemes are known for preventing a threaded fastener from working itself out. Some fastener locking schemes include additional locking hardware, such as a locking washer, cotter pin, lock wire, locking cup or lock plate to secure the fastener. Other fastener locking schemes require specialized modification of the surface of the flange or other component secured by the fastener. For example, some locking schemes rely on friction or deformation of the mating surfaces for the locking action while others require a modified opening (e.g., countersinked well) into which the fastener head is crimped to lock the fastener. Lock washers, pins, castellated nuts, and lock wire are problematic for securing components inside a nuclear reactor as these components are subjected to long term exposure (e.g., on the order of decades) to flow induced vibration, seismic loads, etc. Loosening or failure of a single fastener in an operating nuclear reactor can require reactor shutdown and unscheduled maintenance.

Similarly, in a UHV system, pump down to operating pressures of around $10^{-9}$ Torr or lower typically employs applying a sequence of different pumps (e.g., mechanical, cryogenic, diffusion, ion pumps) in a prescribed sequence over a period of days or weeks. A single fastener failure can require opening the UHV system and consequent unscheduled downtime for pump down on the order of weeks.

The following discloses improved locked fastener arrangements and fastening methods.

SUMMARY

In one embodiment, an apparatus comprises: a threaded fastener including a head shaped to engage a driving tool, a threaded shank extending from a bottom face of the head along a longitudinal axis of the fastener, and an annular flange oriented transverse to the longitudinal axis of the fastener and surrounding the bottom face of the head; and a proximate surface having a receiving hole in which the shank of the threaded fastener is disposed with the bottom face of the head contacting the proximate surface, the proximate surface further having a crimping recess spaced apart from the receiving hole, a portion of the annular flange overlapping the crimping recess being deformed into the crimping recess. In some embodiments the apparatus further includes a proximate member defining the proximate surface, the receiving hole being a through-hole passing through the proximate member, the shank of the threaded fastener passing through the receiving hole; and a distal member having a hole through which the shank of the threaded fastener also at least partially passes. In some such embodiments the hole in the distal member is a tapped hole and the threaded fastener is a screw whose threaded shank engages with threading of the tapped hole. In some such embodiments the hole in the distal member is a through-hole, the threaded fastener is a bolt, and the apparatus further comprises a nut engaging with an end of the threaded shank of the bolt that protrudes out of the through-hole in the distal member, the nut including an annular flange oriented transverse to the longitudinal axis of the bolt and deformed into a crimping recess on a surface of the distal member contacting the nut.

In accordance with another aspect, a method comprises installing a threaded shank of a threaded fastener in a receiving hole formed in a proximate surface, and locking the installed threaded fastener by deforming a portion of a flange of the threaded fastener that overlaps a crimping recess formed in the proximate surface into the crimping recess. In some such embodiments the flange of the threaded fastener is an annular flange and a portion of the annular flange overlaps the crimping recess for any angular position of the installed threaded fastener.

In accordance with another aspect, an apparatus comprises: a bolt including a bolt head and a threaded shank extending from a bottom face of the bolt head along a longitudinal axis of the bolt; first and second members each having a through-hole through which the threaded shaft of the bolt passes, the bolt head being in contact with the first member and a distal end of the threaded shank protruding out of the through-hole of the second member; and a nut threaded onto the distal end of the threaded shank protruding out of the through-hole of the second member such that the bolt and nut form a bolt-and-nut fastener combination securing the first and second members together; wherein the bolt is locked to the first member and the nut is locked to the second member. In some such embodiments the bolt and the nut each have an annular flange, the annular flange of the bolt being deformed into a crimping recess formed in the first member and the annular flange of the nut being deformed into a crimping recess formed in the second member.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figures 1, 2:
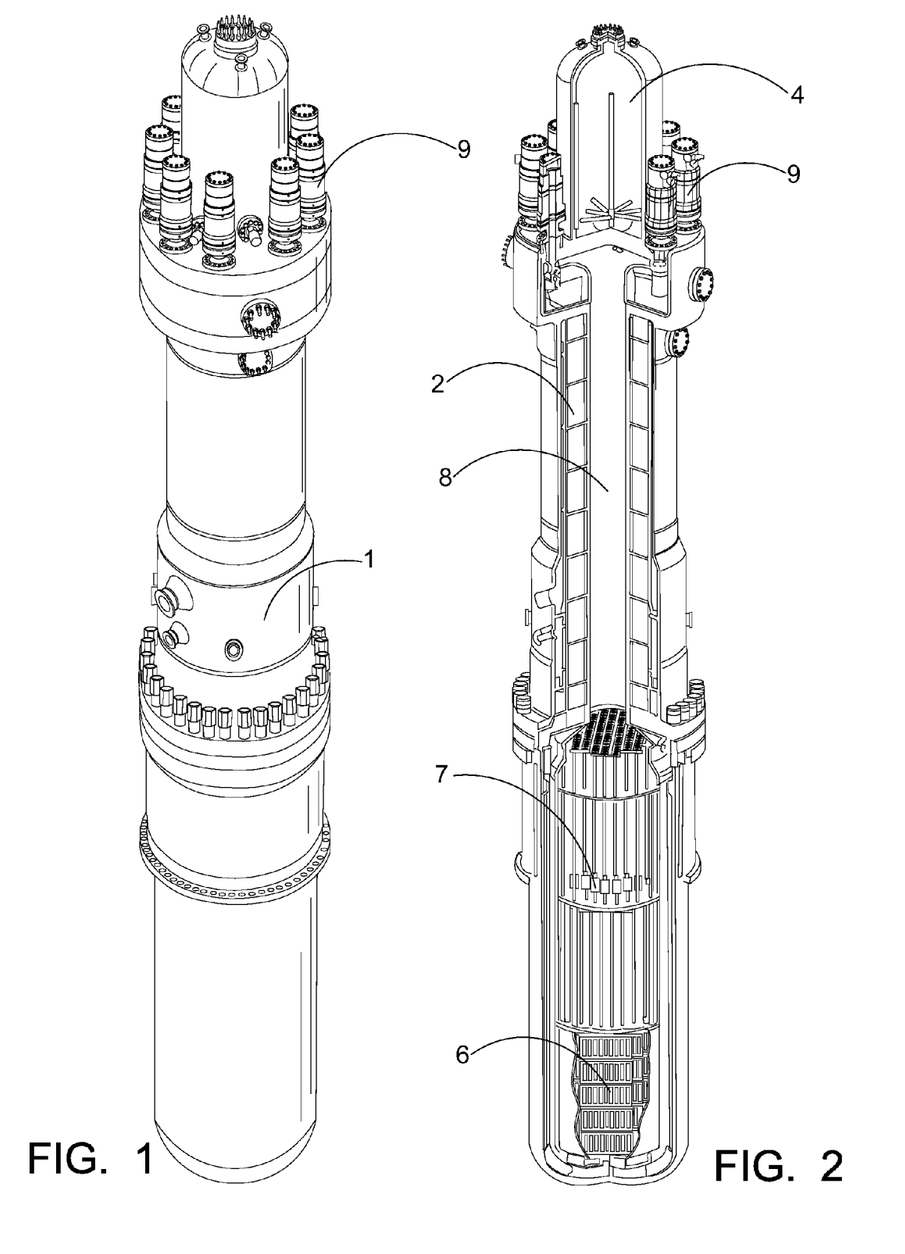
FIGS. 1 and 2 diagrammatically show perspective and perspective partial sectional views, respectively, of an illustrative nuclear reactor of the pressurized water reactor (PWR) variety with internal steam generators (integral PWR).

With reference to FIGS. 1 and 2, an illustrative nuclear reactor 1 of the pressurized water reactor (PWR) variety is shown. The illustrative PWR 1 employs internal steam generators 2 (see FIG. 2) located inside the pressure vessel (i.e., integral PWR 1), but embodiments with the steam generators located outside the pressure vessel (i.e., a PWR with external steam generators) are also contemplated. The illustrative PWR 1 includes an integral pressurizer 4, but a separate external pressurizer may instead be employed. Fuel rods comprising fissile material (e.g., containing $^{235}U$) make up the nuclear reactor core 6 seen in FIG. 2. The illustrative PWR includes internal control rod drive mechanisms (internal CRDMs) 7; however, external CRDMs are also contemplated. Circulation of primary coolant in the illustrative PWR 1 is upward through the reactor core 6 and through a central riser 8 (i.e., the "hot leg"), and back down to below the reactor core 6 via a downcomer annulus defined between the central riser 8 and the pressure vessel (i.e., the "cold leg"). The primary coolant circulation is assisted or driven by reactor coolant pumps (RCPs) 9 which are externally mounted near the pressurizer 4 in the illustrative PWR 1, but which may be more generally located elsewhere, or may be canned internal RCPs located inside the pressure vessel. It is also contemplated to omit the RCPs entirely and to rely upon natural circulation of primary coolant driven by heating from the reactor core.

The PWR of FIGS. 1 and 2 include numerous components internal to the pressure vessel of the PWR that may be fastened using threaded fasteners (e.g., screws engaging threaded blind holes or threaded through-holes; nut/bolt combinations secured in through-holes, threaded rods, or so forth). Such components may include, for example: fasteners securing control rod guide frames; fasteners securing internal CRDMs 7, fasteners securing internal canned pumps; and so forth. Such components, including the fasteners, should be reliable against failure for long periods, e.g. on the order of years or decades in some cases. Additionally, the PWR may include components mounted at vessel penetrations using threaded fasteners, such as the RCPs 9. These fasteners also should be reliable to avoid primary coolant leakage requiring reactor shutdown and unscheduled maintenance. It will also be understood that the PWR of FIGS. 1 and 2 is merely an illustrative example. Similar considerations apply to fasteners employed in nuclear reactors of other types, such as boiling water reactor (BWR) designs, as well as in other applications such as ultra-high vacuum (UHV) systems where fastener reliability is desirable. For illustrative purposes, the locked fasteners and fastening methods disclosed herein are described with illustrative reference to securing the CRDMs 7 inside the reactor vessel.

Figure 3:
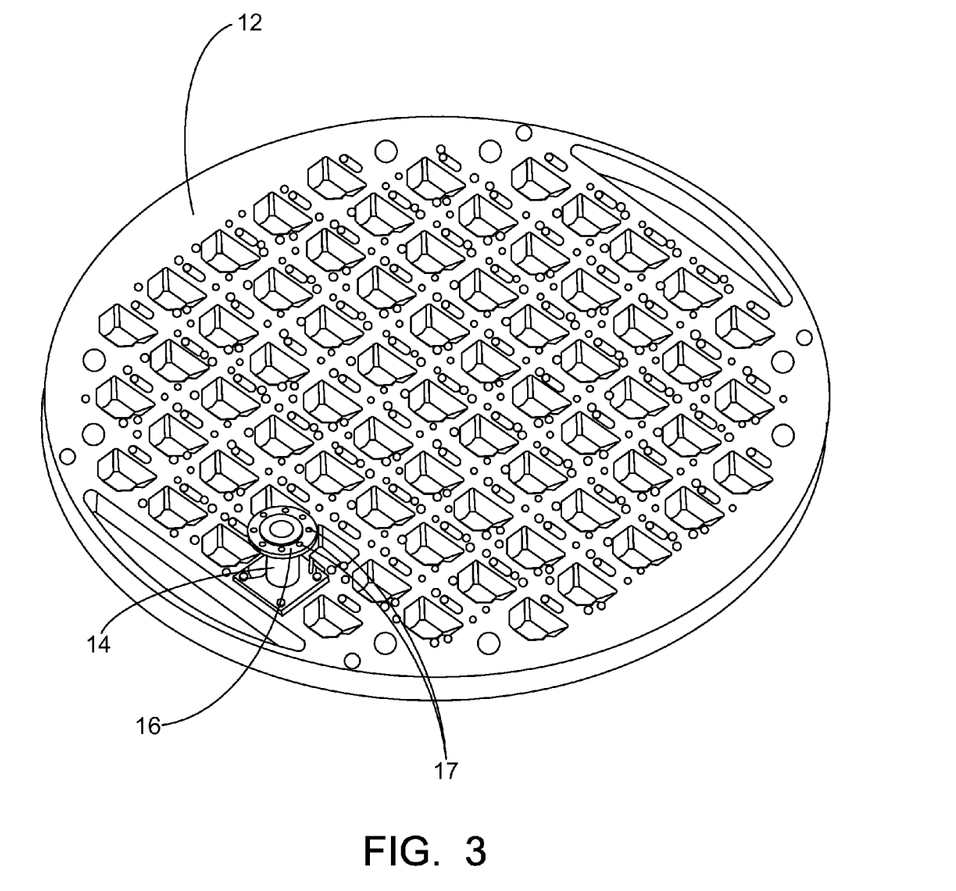
FIG. 3 is a perspective view of a control rod drive mechanism (CRDM) standoff and support plate suitably used in the reactor of FIGS. 1 and 2.

FIG. 3 shows an illustrative support plate 12 to which a CRDM is to be mounted via a standoff 14. The standoff 14 has mounting flange 16 with an upper surface to which the CRDM is to mount. The flange 16 has holes (two of which are labeled 17) for mounting the CRDM. Threaded fasteners are also used to secure the bottom flange of the standoff 14 to the support plate 12.

Figure 4:
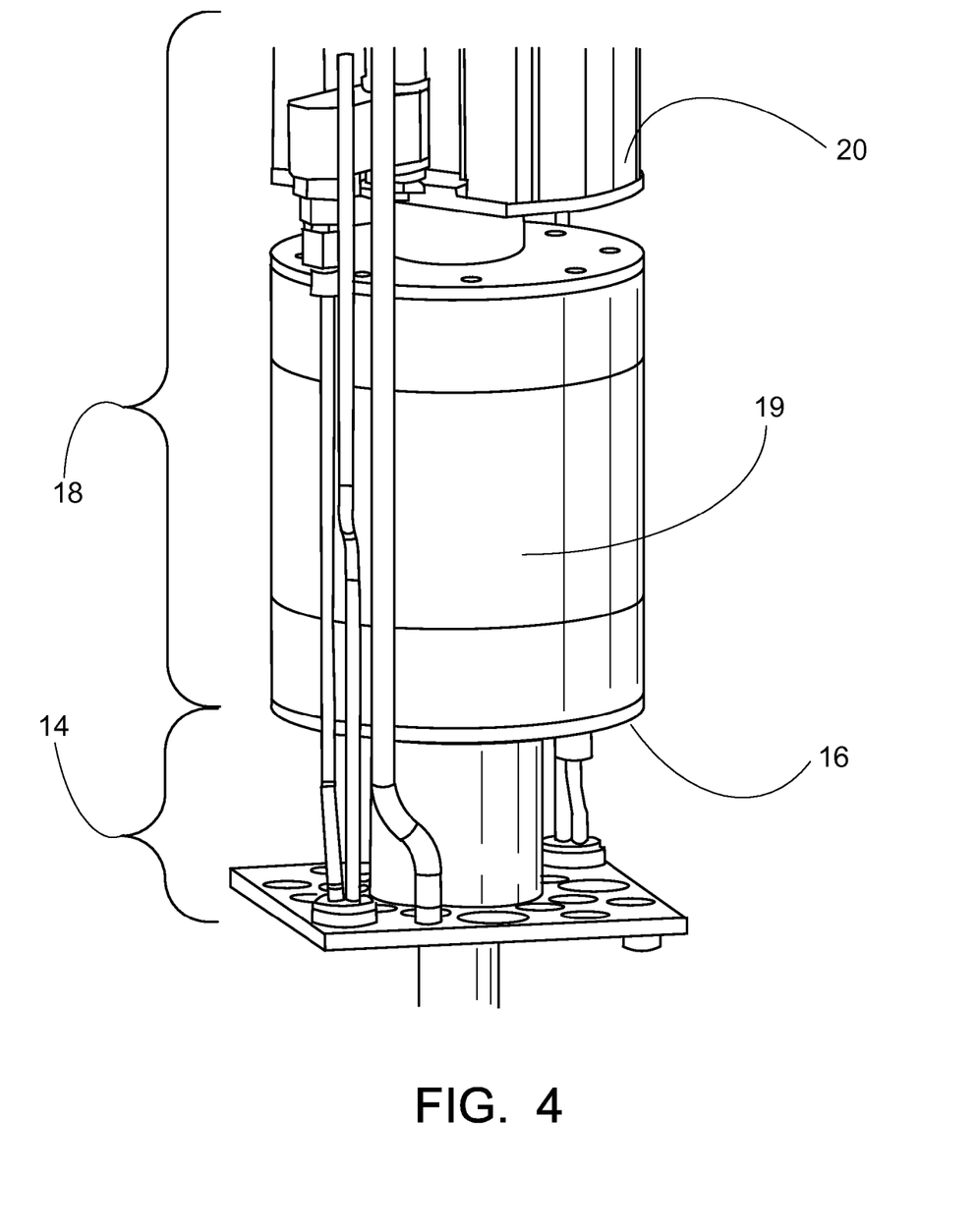
FIG. 4 is a perspective view of a portion of a CRDM mounted on the standoff and support plate of FIG. 3.

FIG. 4 illustrates the lower portion of a CRDM 18 including a stepper motor 19 for precisely adjusting the control rod position respective to the reactor core 6 (i.e., "gray rod" control). The CRDM 18 is suitably of a type having a separate scram mechanism 20 located above the motor 19 as described in U.S. Pub. No. 2011/0222640 A1 filed Mar. 12, 2010 and U.S. Pub. No. 2010-0316177 A1 filed Mar. 12, 2010, both of which are incorporated herein by reference in their entireties; alternatively, the CRDM can employ a motor with separable ball nut, or can be a dedicated shutdown rod, or can have some other suitable configuration. The lower end of the CRDM 18 is mounted to the standoff 14 via the upper flange 16. Further illustrative holes are provided in a flange connecting the scram mechanism 20 with the motor 19. It will be noted that these connections involve a blind hole in the casing of the CRDM motor 19. Accordingly, a suitable threaded fastening arrangement is for the blind hole to be threaded and to employ a screw to secure flange 16 to the casing of the motor 19, and similarly for the connection of the scram mechanism 20 to the motor casing. Similarly, if the mounting surface is "thinner", e.g. a flange or plate (possibly support plate 14 of FIG. 3), then the threaded hole with which the screw engages may be a through-hole rather than a blind hole.

Figures 5, 6:
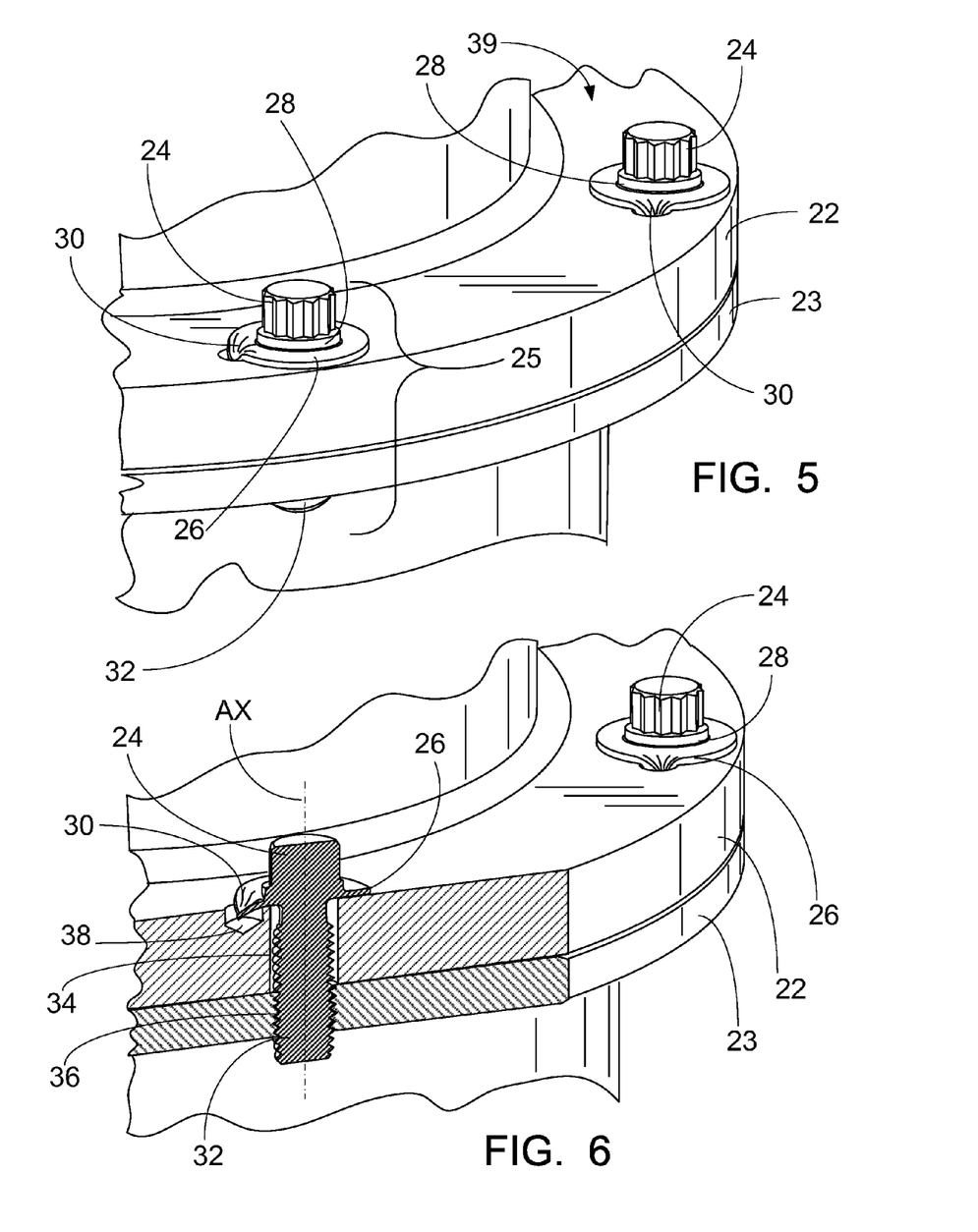
FIG. 5 is perspective view of a flanged connection suitably used for the CRDM/standoff coupling of FIG. 4.
FIG. 6 is a cut-away view of one of the fasteners of the flanged connection of FIG. 5.
Figure 7:
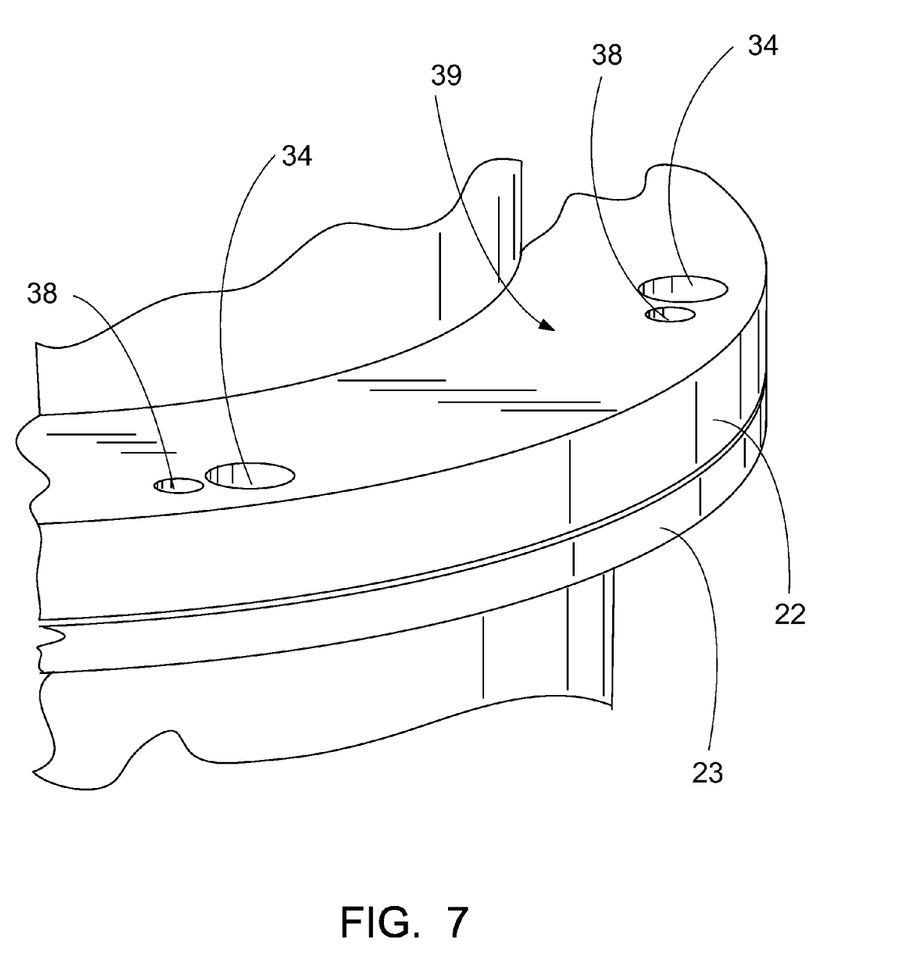
FIG. 7 is a view of the crimping hole and receiving hole of FIG. 5 with the fastener omitted.

With reference to FIGS. 5-10, a suitable locked fastener embodiment employing a screw engaging a threaded through-hole is illustrated and described. It will be appreciated that the through-hole can be replaced by a blind hole deep enough to receive the screw, e.g. as in the illustrative cases of FIG. 4. In the example of FIGS. 5-7, the application is securing two flanges 22, 23 using a screw 25 having a head 24. The flange closest to the head 24 is referred to herein as the proximate flange 22, while the flange furthest from the head 24 is referred to herein as the distal flange.

FIG. 5 illustrates screws (one of which is labeled 25) with twelve-point heads 24. The screws 25 secure upper (i.e., proximate) flange 22 and lower (i.e. distal) flange 23, which is a typical application. Each screw head 24 has a deformable flange 26 that rests on the top (i.e., proximate) surface of the proximate flange 22 when the screw 25 is fully inserted, and a portion of the annular flange 26 is crimped to lock the screw head 24 in place, preventing the screw 25 from backing out (i.e., loosening). The annular flange 26 of the screw head 24 has an integral stiffening ring 28 machined (or otherwise manufactured) just below the twelve-point screw head 24. The stiffening ring 28 is located around the circumference of the head 24 at a junction between the head 24 and the annular flange 26, and reduces the likelihood of a crack generated during the deformation of the flange 26 propagating into the head 24. However, the thickness and lateral extent of the annular flange 26, and the deformation force applied, are designed to make the formation of such a crack an unlikely event, and so the stiffening ring 28 is optionally omitted. In the illustrative embodiment, the lower (i.e., distal) flange 23 includes a through-hole and the shank of the screw 25 is long enough to extend completely through the hole in the lower flange 23, as shown by the slightly visible shank 32 in FIG. 5. Again, however, it is to be understood that the screw 25 may alternatively engage a blind hole, or as another variant the distal flange 23 can have a through-hole as shown but the screw 25 may be too short to extend all the way through the distal through-hole.

Although two flanges 22, 23 are shown, the screw 25 may be used to attach other types of structural members, such as connecting the standoff 14 with the support plate 12 (see FIG. 3).

The screw 25 is installed in the usual way, i.e. by threading it into the receiving threaded hole (which may be a blind hole or through-hole). After threading the screw into the hole, the annular flange 26 is crimped into a hole in the flange that is spaced apart from the receiving threaded hole to form a crimp region 30. The crimp region 30 acts as a lock to prevent the screw 25 from backing out (i.e., loosening). The force for the crimp is applied axially, that is, parallel to the axis of the screw or bolt, and orthogonally to the direction of rotation of the screw 25. Because the force is applied axially, the risk of loss of preload of the fastener is lessened. The axial crimping of each fastener into a crimping recess or hole eliminates the need for a separate locking piece. The crimp prevents rotation and backing out (i.e., loosening) of the fastener.

A twelve-point head is shown in FIGS. 5-10, but the crimp lock will work with a variety of fastener heads, such as but not limited to twelve- or eight-point heads, hex heads, Phillips or flat-heads, allen heads, or star (Torx™) heads. While a screw is shown in FIGS. 5-10, the deformable flange and crimp can be used with a screw, bolt, nut, threaded shaft, or other threaded fastener. In the case of a nut, the deformable flange is suitably on the nut itself (see FIGS. 11-13 and related discussion).

FIG. 6 shows a cross-section through one of the screws 25 and its annular flange 26 with deformation or crimp 30. The screw 25 has the head 24 and a threaded shank 32 extending from a bottom face of the head 24 along a longitudinal axis AX of the fastener 25. The annular flange 26 is oriented transverse to the longitudinal axis AX of the fastener 25 and surrounds the bottom face of the head 24. The shank 32 passes through a through-hole 34 in the proximate flange 22 (that is, the flange closest to the head 24) and that passes at least partway into (and in the illustrative example all the way through) an opening or hole 36 in the distal flange 23 (that is, the flange furthest away from the head 24). In cutaway, it can be seen that the hole 34 in the upper flange 22 is unthreaded and the hole 36 in the lower flange 23 is threaded (tapped). The distal opening or hole 36 is threaded (i.e., tapped) to engage threading on the shank 32 of the screw 25. When securing two flanges 22, 23 together using screw 25, the hole or opening 34 in the proximate flange 22 is a through-hole so that the shank 32 can pass completely through and into the hole or opening 36 in the distal flange 23. The distal hole or opening 36 is tapped and may be a through-hole (as shown), or a blind hole.

The crimp 30 is a deformation of the annular flange 26 of the screw head 24 into a crimping hole or recess 38 formed in the proximate surface 39 of the proximate flange 22 (i.e., in the surface 39 contacting the head 24 of the inserted screw 25). Laterally, the crimping recess 38 is located on the proximate surface 39 "next to" the opening 34 into which the screw 25 is inserted. More precisely, the lateral location of the crimping recess 38 can be specified as follows: When the screw 25 is installed in the openings 34, 36, the outside diameter of the flange 26 is centered on crimping recess 38. The centering need not be perfect, but should be close enough so that a portion of the recess 38 is covered by the flange 26. This ensures that there is a portion of the annular flange 26 that overlaps the crimping recess 38 and hence can be crimped into the recess 38 to form the crimp 30.

Additionally, it is preferable to have the lateral location of the crimping recess 38 far enough away from the opening 34 so that a portion of the recess 38 remains visible when the screw 25 is fully inserted into the openings 34, 36. The visible portion of the crimping recess 38 serves as an alignment aid for aligning the awl or other instrument used to form the crimp 30. This alignment aspect may be less important if a robotic apparatus is employed to install the screw 25 and form the crimp 30. However, having a portion of the crimping recess 38 remain uncovered by the annular flange 26 also makes the crimping easier by providing a mechanical guide for centering the awl or punch, and the resulting crimp 30 expected to be more reliable as compared with a crimp formed with the annular flange 26 completely overlapping the crimping recess 38. As seen in FIGS. 5 and 6, when a portion of the crimping recess 38 remains uncovered by the annular flange 26, the resulting crimp 30 is a wedge-shaped deformation of the free edge (i.e., the outer periphery) of the annular flange 26. In contrast, if the crimping recess is completely covered by the annular flange then the resulting crimp is a "dimple" formed in the interior of the annular flange. Deforming the free edge of the annular flange 26, as in the example of FIGS. 5 and 6, is easier than punching a dimple into the interior of the flange, and the latter operation is more likely to puncture the flange and/or to generate stress-induced cracking of the flange.

In general, the crimp 30 should be a plastic deformation of the annular flange 26, but the crimping operation should not induce cracking or puncturing of the flange 26. Cracking or puncturing of the flange can produce particulates that can contaminate the primary coolant flowing through the nuclear reactor, and/or sharp edges that can abrade neighboring components or injure maintenance personnel, and crack propagation from the flange 26 can, in extreme cases, damage the screw head 24. (Again, the integral stiffening ring 28 helps to reduce the possibility of a crack propagating into the head 24).

In general, the rotation of the screw 25 during installation stops when the screw head 24 comes into contact with the proximate surface 39 of the proximate flange 22. Alternatively, the distal hole in the distal flange 23 can serve as an insertion stop, either through a finite depth in the case of a blind hole, or by terminating the tap, tapering the hole, or so forth. In any of these stopping mechanisms, it is difficult or impossible to predict the angular position of the rotating screw 25 at the point of complete insertion. However, because the annular flange 26 has continuous rotational symmetry, the angular position of the rotating screw 25 at the point of complete insertion does not affect the subsequent crimping operation.

The crimped region 30 of the deformable flange 26 is crimped into crimping recess 38. In the embodiment of FIG. 6, the crimping recess 38 is a blind hole; however, the crimping recess can also be a through-hole. Moreover, the crimping recess 38 can have a shape other than that of a round hole, although sharp geometries (e.g., a square hole) may have a disadvantage in increasing the likelihood of cracking or puncturing the flange 26 during crimping.

FIG. 7 shows the arrangement for the receiving hole 34 and crimping recess 38 on the proximate surface 39. The arrangement consists of the main screw hole 34 with a (typically though not necessarily) smaller crimping recess 38 off to the side. In some embodiments, the crimping recess 38 may be machined completely through the flange (i.e., a through-hole). The illustration shows only a single crimping recess 38 for each receiving hole 34; however, two, three, four, or more crimping recesses may be provided to provide multiple crimps for more locking force. A symmetric arrangement of two, three, or more crimping recesses around the receiving hole may be advantageous to ensure symmetry of the fastening.

In general, the closer the crimping recess 38 is to the receiving hole 34, the smaller the diameter of the annular flange 26 of the screw head 24 can be made. A smaller-diameter annular flange increases manufacturing part yield (since the relatively thin deformable flange 26 is a likely feature to be damaged during manufacturing or transport) and footprint of the locked fastener. In one contemplated embodiment having the geometry of FIG. 7, the edge break for the main screw hole 34 is limited to 0.005 inch maximum thereby allowing the crimping hole to be located closer to the main screw hole. As a result, the diameter of the deformable flange 26 of the fastener can be minimized. The depth of crimp 30 should be sufficient to provide the desired locking force, but a deeper crimp increases the likelihood of cracking or puncturing of the flange 26. In some embodiments having the geometry of FIGS. 5-7, the crimp depth is specified to be 2.5 times the thickness of the flange. For example, in one contemplated embodiment the thickness of the flange 26 away from the head 24 (that is, the portion of the flange 26 to be crimped) is nominally 0.025-inch thick which allows for a significant crimp that will prevent loosening of the fastener. Ductile material, such as 316 Stainless Steel, is used for the fastener 25 to reduce the likelihood of cracking during the crimping process. In some embodiments a crimp depth of about 2.5 times the flange thickness is contemplated (e.g., about 0.06 inch crimp depth for a flange thickness of 0.025 inch). For a given screw size and a given specified locking force (e.g., measured by the breakaway torque needed to overcome the crimp 30 and back out the screw 25), test runs for flanges of different thickness and for different crimping forces can be performed to optimize the annular flange 26 and the crimping operation to maximize yield and minimize or eliminate cracking or puncturing.

Figure 8:
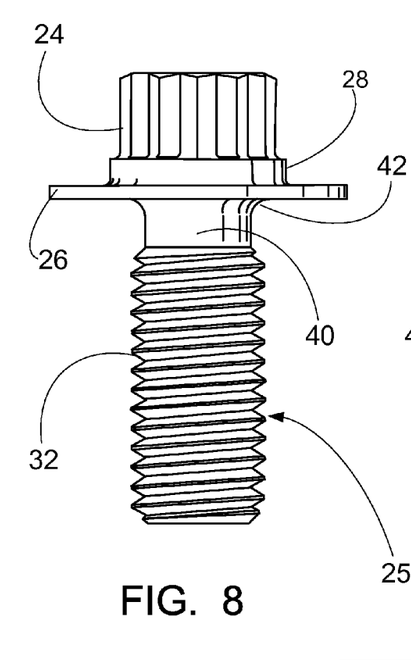
FIGS. 8 and 9 show side and perspective views, respectively of a screw including a deformable flange for use in locked fastener approaches disclosed herein.
Figure 9:
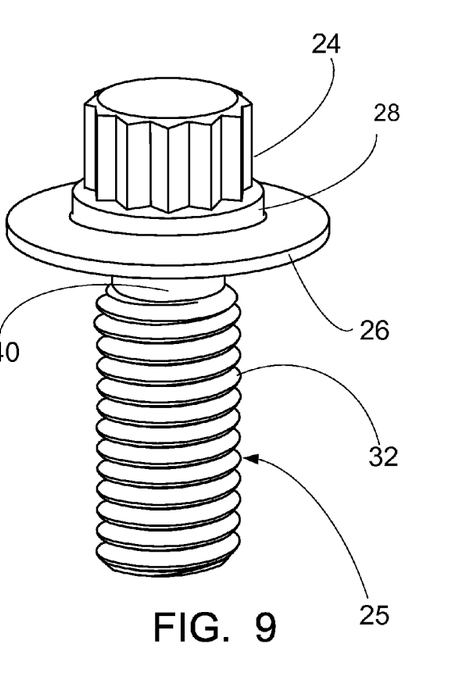
Figure 10:
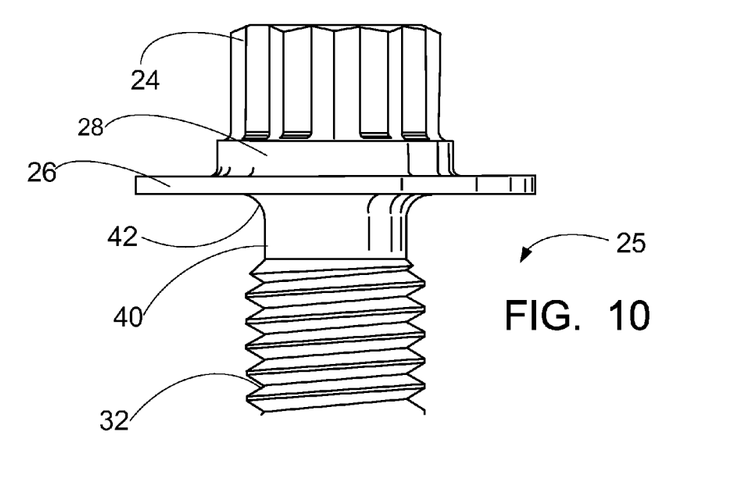
FIG. 10 is a detail of the head of the fastener of FIGS. 8 and 9.

FIGS. 8-10 are details of the screw 25. The illustrative screw 25 incorporates fillets into the head design. As best seen in FIG. 10, the screw shank 32 is undercut at 40 to allow for a fillet 42 under the screw head 24. This, along with the integral stiffening ring 28, helps to reduce the possibility of a crack propagating into the head 24 and to improve fatigue capability in service. By undercutting the screw shank 32, the fillet 42 under the screw head 24 clears the small edge break on the hole.

In the locked fastener approaches disclosed, the modification to the proximate surface 39 (i.e., the mounting surface contacting the head 24 of the fastener 25) is modified only in the formation of the crimping recess 38, which can be a blind hole or a through-hole. Since this surface 39 is already being machined or otherwise processed to form the receiving hole 34, the additional machining or processing is not different in kind from that already performed on the flange 22. Indeed, the proximate surface 39 can be a planar surface with no countersunk features. In contrast, formation of a countersunk feature into which a fastener is crimped to lock the fastener may entail an additional or different countersink machining operation. The annular flange 26 is an integral part of the screw 25, and thus does not constitute an additional part that can be lost (as compared with a locking washer or the like which is an additional component). If the screw 25 is a die-cast component then the annular flange 26 is straightforwardly incorporated into the die. Another advantage is that the crimp 30 is readily observable during assembled component inspection prior to final installation and close-up of the reactor vessel (or UHV chamber or other restricted-access location).

The locking strength is also readily tailored to specific situations. For example, a single crimping recess 38 can be used in most applications, but for components or environments that experience particularly aggressive vibrations, thermal cycling, or so forth additional crimping recesses can be added to the surface 39 to allow for additional crimps to provide greater locking strength.

The crimping operation employs axial force, in the direction of the fastener axis, which is unlikely to release any preload, as no torque is being applied in the rotational direction of the fastener 25 during crimping. The locked fastening process can be performed manually, e.g. using an awl, punch (e.g., spherical punch), or other handheld instrument to crimp the flange 26 into the crimping recess 38 to form the crimp 30. Alternatively, the locked fastening process can be automated, e.g. being performed using a robotic apparatus employing a rotary drive tool to install the screw 25 and an axial punch tool to form the crimp 30. Robotic processing can employ a virtual part model (e.g. CAD model) to identify the location of the crimping recess 38. Alternatively, a machine vision sub-system can be employed to identify the crimping recess 38 partially covered by the annular flange 26 after the screw is threaded in. Other automated processing techniques can also be employed.

The illustrative example of FIGS. 5-10 pertains to a threaded fastener in the form of the illustrative screw 25. More generally, the disclosed locking approach is applicable to substantially any type of threaded fastener. With reference to FIGS. 11-15, an example of a bolt-and-nut threaded fastener combination is described. The illustrative nut (FIGS. 11-13) employs a hex-head, while the illustrative bolt (FIG. 14) employs a twelve-point head. In the bolt-and-nut threaded fastener combination, the bolt threads into the nut, or viewed in the alternative the nut threads onto the bolt. Consequentially, it is possible for the bolt to back out of the nut, or for the nut to back off of the bolt. To lock against both possibilities, both the nut and the bolt include the disclosed annular flange deformed into a crimping recess.

Figure 11:
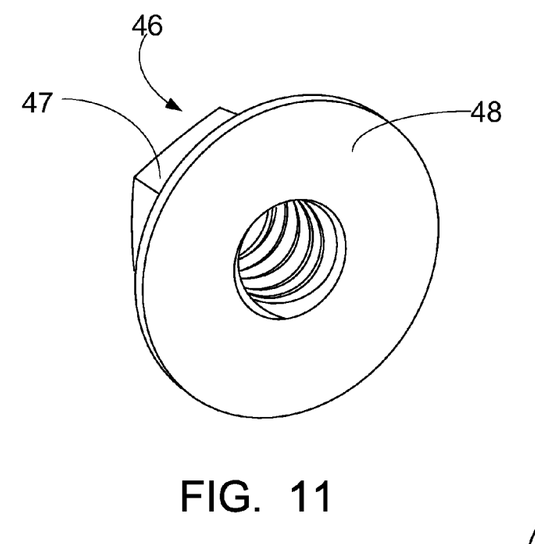
FIGS. 11-13 show alternative perspective views of a nut including a deformable flange for use in locked fastener approaches disclosed herein.
Figure 12:
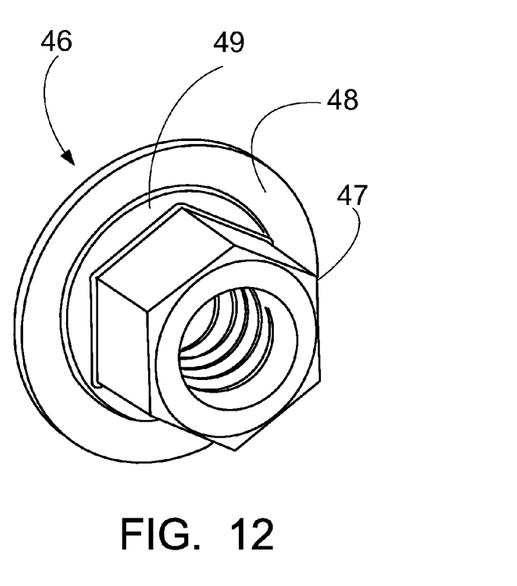
Figure 13:
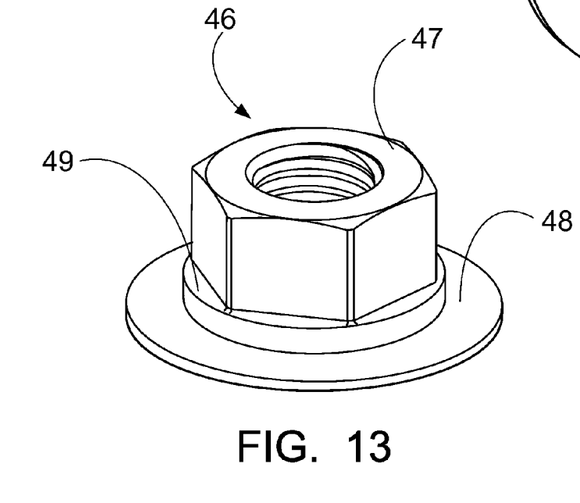

With reference to FIGS. 11-13, a nut 46 is shown in isolation. The nut 46 includes a "head" 47 and an annular flange 48. (The term "head" is not normally used in conjunction with a nut, but as used herein the head is the part of the threaded fastener that is engaged by a ratchet or other tool used to rotate the fastener or to hold the fastener against rotation during installation.) FIG. 11 shows the face of the nut 46 which contacts with the fastened component or member. This face includes the annular flange 48 that serves the same function (and optionally has the same thickness, ductility, and composition) as the annular flange 26 of the screw 25 of FIGS. 8-10. In the embodiment shown, the engagement face of the nut 46 (FIG. 11) is smooth, but it is contemplated that the face may be serrated or scalloped to better grip the surface of the fastened component. The deformable flange 48 extends around the circumference of the face of the nut which contacts with a member to be fastened. As best seen in FIG. 13, the head 47 of the illustrative nut 46 is a hex head; however, a twelve-point head or other type of head can also be used. The nut 46 has a stiffening ring 49 at the base of the head 47 which is analogous in shape and function to the stiffening ring 28 at the base of the head 24 of the screw 25.

Figure 14:
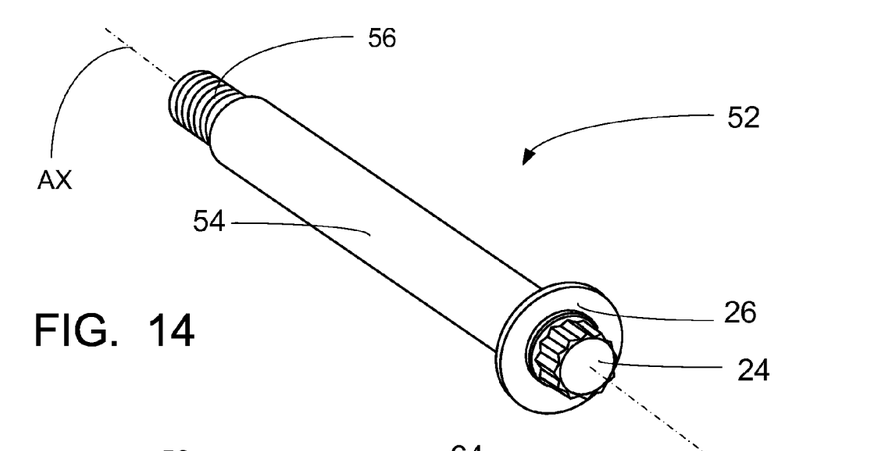
FIG. 14 is a perspective view of a bolt including a deformable flange for use in combination with the nut of FIGS. 11-13 in locked fastener approaches disclosed herein.

FIG. 14 shows a shoulder bolt 52 with twelve-point head 24, which is compatible with the nut 46 of FIGS. 11-13. The bolt 52 includes the same head 24 with annular flange 26 as the screw 25 of FIGS. 8-10. However, the threaded shank 32 of the screw 25 is replaced in the bolt 52 by a threaded shank 54 with threading 56 at a distal end of the shank 54. The threading 56 is sized and shaped to engage the threads of the nut 46. Alternatively, the threading can extend further up the shank or even all the way up to the head 24, optionally with space left for a fillet as in the screw 25 of FIGS. 8-10. The bolt 52 has the head 24 and the threaded shank 54 extending from a bottom face of the head 24 along longitudinal axis AX of the bolt 52. The annular flange 26 is oriented transverse to the longitudinal axis AX of the bolt 52 and surrounds the bottom face of the head 24.

Figure 15:
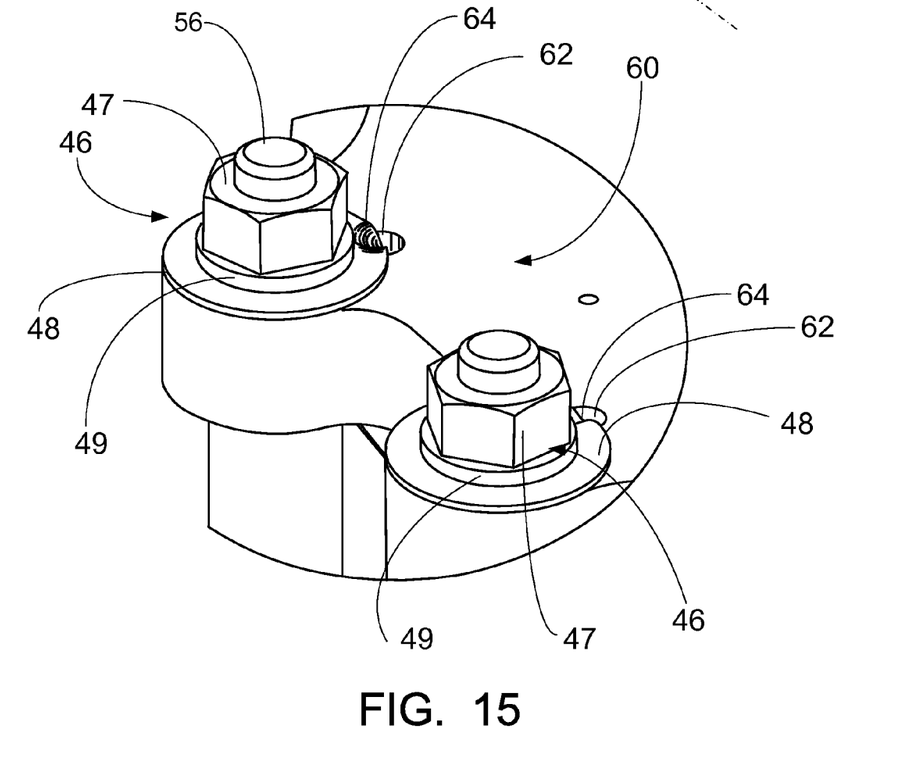
FIG. 15 is a perspective view of the nut of FIGS. 11-13 installed on the threaded end of the bolt of FIG. 14 in accordance with locked fastener approaches disclosed herein.

FIG. 15 shows a typical installation of nuts 46 onto the distal ends 56 of bolts 52. In FIG. 15, the nuts 46 contact a proximate surface 60 which is proximate to the heads 47 of the nuts 46. (The surface 60 is distal from the bolt heads). The surface 60 includes a crimping recess 62 corresponding to each receiving hole that receives a bolt-and-nut combination. The portion of the annular flange 48 of the nut 46 overlapping the crimping recess 62 is deformed into the recess 62 to form crimp 64.

The crimp 64 locks the nut 46 against rotation. However, this, by itself, is not sufficient to prevent the bolt 52 from backing out of the nut 46. Although not shown, on the opposite side of the assembly of FIG. 15, where the head 24 of the bolt 52 is located, the annular flange 26 of the bolt 52 is similarly crimped into a crimping recess to lock the bolt against rotation. (Not shown for bolt 52, but analogous to the crimp 30 of the flange 26 shown for the screw 25 in FIGS. 5-6). By crimping both the flange 48 of the nut 46 and the flange 26 of the bolt 52, both backing of the bolt out of the nut and backing of the nut off the bolt are prevented, thus providing locking of the bolt-and-nut fastener combination. Note that for the bolt-and-nut fastener combination, the flange (or other element) that serves as the proximate flange for the nut is the distal flange for the bolt, and the flange (or other element) that serves as the proximate flange for the bolt is the distal flange for the nut.

The use of hex nuts and twelve-point bolts in the example of FIGS. 11-15 is merely illustrative, and various head combinations (e.g., twelve-point bolts and twelve-point nuts; twelve-point bolts and hex nuts as illustrated; hex-head bolts and twelve-point nuts; hex nuts and hex-head bolts; various other types of heads; and so forth) are contemplated.

Figure 16:
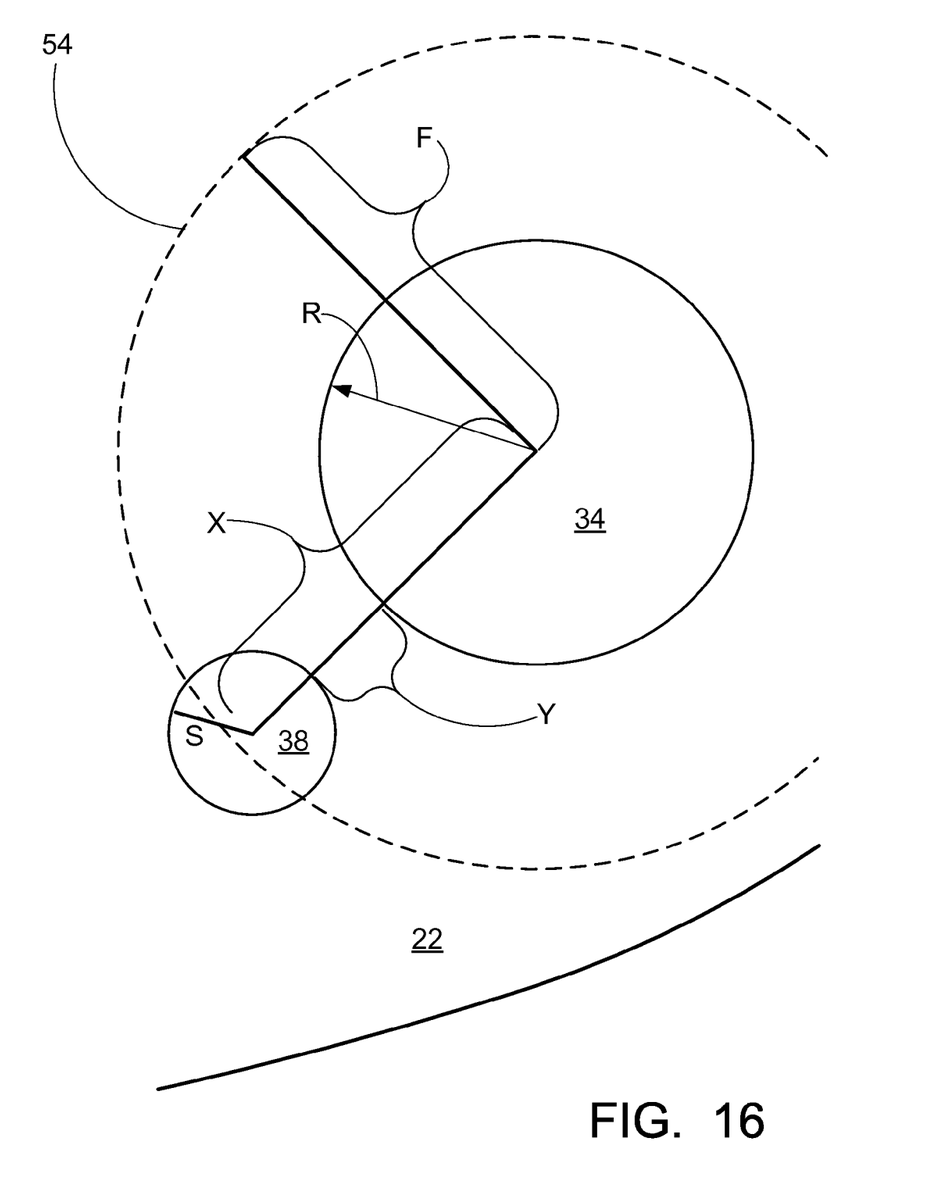
FIG. 16 diagrammatically shows suitable positions of a receiving hole, a crimping hole and a flange for use in locked fastener approaches disclosed herein.

FIG. 16 diagrammatically shows the relationship between receiving hole 34, crimping recess 38 (which may be a blind hole or a through hole), and the circumference 54 of the deformable flange (shown in outline by a dashed line). FIG. 16 is an overhead diagram of upper (i.e., proximate) flange 22 of FIGS. 5-7. The radius of the deformable flange is labeled F. The radius of the receiving hole 34 is labeled R. The radius of the crimping hole 38 is labeled S. The distance from the center of the receiving hole 34 to the center of the crimping hole 38 is labeled X. (In other words, X is the center-to-center separation between the crimping hole 38 and the receiving hole 34). The shortest distance (along a line connecting the centers) from the edge of the receiving hole 34 to the edge of the crimping hole 38 is labeled Y. It is contemplated that the crimping hole 38 and receiving hole 34 could overlap, meaning that Y is zero, but, in the embodiment shown, Y has a positive value. Given that the radii R and S are the distances from the centers of their respective circles to their edges, and Y is the distance between the edges of the circles, $X=R+Y+S$.

The deformable flange radius F must be at least greater than R, or the fastener would not have any surface mating with the top member to be fastened (e.g. the upper flange 22). In order for the deformable flange to overlap the crimping hole 38, the deformable flange radius F must also extend farther than the separation Y (plus the radius R) between the receiving hole 34 and the crimping hole 38. That is, F must be greater than $R+Y$. If the deformable flange circumference 54 passes through the exact center of the crimping hole 38, then F will equal X, that is: $F=X=R+Y+S$. In the embodiment shown, F is slightly greater the X, mainly for illustration.

If the radius of the deformable flange extends farther than the crimping hole 38 (i.e., $F>X+S$), then the flange completely covers the crimping recess. In this case, the crimp is a punch into the interior of the flange. As previously pointed out, such a crimp is difficult to form manually due to inability to see where to crimp, but could be done robotically, albeit requiring more force than a crimp where the deformable flange is not supported by the upper flange around the entire circumference of the crimping hole. A manual crimp could also be performed if, for example, markings indicating the position of the crimping hole are provided on the proximate surface, or a special alignment tool is employed.

In embodiments in which the deformable flange only partially covers crimping hole 38 (e.g., as in FIG. 16), it follows that F is less than $X+S$ and F is greater than $X-S$. In other words, $(X-S)<F<(X+S)$. (In an alternative formulation, F is between $R+Y$ and $R+Y+2\times S$. As mentioned above, it is contemplated that other shapes besides a circle may be used, in which the preferred flange width could be based on a circle which circumscribes the shape of the crimping recess.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
  a threaded fastener including a head shaped to engage a driving tool, a threaded shank extending from a bottom face of the head along a longitudinal axis of the fastener, an annular flange oriented transverse to the longitudinal axis of the fastener and surrounding the bottom face of the head, and a stiffening ring disposed at a junction formed by the head and the annular flange; and
  a proximate surface having a receiving hole in which the shank of the threaded fastener is disposed with the bottom face of the head contacting the proximate surface, the proximate surface further having a crimping recess spaced apart from the receiving hole, a portion of the annular flange overlapping the crimping recess extending into the crimping recess,
  wherein a diameter of the stiffening ring is greater than a maximum diameter of the head, and less than a diameter of the annular flange.

2. The apparatus of claim 1 wherein the annular flange does not completely overlap the crimping recess.

3. The apparatus of claim 1 wherein a portion of the edge of the annular flange is deformed into the crimping recess.

4. The apparatus of claim 1 wherein the annular flange has a circular perimeter of radius F where (X−S)<F<(X+S) and X is the center-to-center separation between the receiving hole and a circle of radius S circumscribing the crimping recess.

5. The apparatus of claim 4 wherein the crimping recess is circular with radius S.

6. The apparatus of claim 1 wherein the annular flange has a circular perimeter with radius equal to the center-to-center separation between the receiving hole and the crimping recess.

7. The apparatus of claim 1 further comprising:
a proximate member defining the proximate surface, the receiving hole being a through-hole passing through the proximate member, the shank of the threaded fastener passing through the receiving hole; and
a distal member having a hole through which the shank of the threaded fastener also at least partially passes.

8. The apparatus of claim 7 wherein the hole in the distal member is a tapped hole and the threaded fastener is a screw whose threaded shank engages with threading of the tapped hole.

9. The apparatus of claim 8 wherein the tapped hole in the distal member is one of a tapped blind hole and a tapped through-hole.

10. The apparatus of claim 7 wherein the hole in the distal member is a through-hole, the threaded fastener is a bolt, and the apparatus further comprises:
a nut engaging with an end of the threaded shank of the bolt that protrudes out of the through-hole in the distal member, the nut including an annular flange oriented transverse to the longitudinal axis of the bolt and deformed into a crimping recess on a surface of the distal member contacting the nut.

11. The apparatus of claim 7 wherein one of the proximate and distal members is a control rod drive mechanism (CRDM).

12. The apparatus of claim 1 wherein the head of the fastener is one of a hex head, an eight-point head, a twelve-point head, a Phillips head, an allen head, and a star head.

13. The apparatus of claim 1 wherein the proximate surface is a planar surface with no countersunk features.

14. The apparatus of claim 1 wherein the crimping recess is one of a blind hole and a through-hole.

15. The apparatus of claim 1 further comprising:
a nuclear reactor including a nuclear reactor core comprising fissile material and a pressure vessel containing the nuclear reactor core, the threaded fastener, and the proximate surface.

16. An apparatus comprising:
a bolt including a bolt head and a threaded shank extending from a bottom face of the bolt head along a longitudinal axis of the bolt;
first and second members each having a through-hole through which the threaded shaft of the bolt passes, the bolt head being in contact with the first member and a distal end of the threaded shank protruding out of the through-hole of the second member; and
a nut threaded onto the distal end of the threaded shank protruding out of the through-hole of the second member such that the bolt and nut form a bolt-and-nut fastener combination securing the first and second members together;
wherein the bolt is locked to the first member and the nut is locked to the second member, and
wherein the bolt and the nut each have an annular flange with a stiffening ring about its inner perimeter, the annular flange of the bolt extending into a crimping recess formed in the first member and the annular flange of the nut extending into a crimping recess formed in the second member.

* * * * *